United States Patent [19]
Smart et al.

[11] 3,816,224
[45] June 11, 1974

[54] FLORAL DISPLAY

[75] Inventors: Ted Smart, Melrose Park, Ill.; Paul R. Witt, Jr., Muscatine, Iowa

[73] Assignee: Bowl-O-Beauty Co., Melrose Park, Ill.

[22] Filed: Dec. 19, 1972

[21] Appl. No.: 316,475

[52] U.S. Cl. ................. 161/26, 47/41.12, 161/18
[51] Int. Cl. ................................................ A01n 3/00
[58] Field of Search ............... 161/26, 18; 47/41.12

[56] References Cited
UNITED STATES PATENTS

| | | | |
|---|---|---|---|
| 2,759,285 | 8/1956 | Bussert | 161/18 |
| 3,616,105 | 4/1969 | Marks | 161/18 UX |
| R23,625 | 3/1953 | Bussert | 47/41.12 |

*Primary Examiner*—William E. Schulz
*Attorney, Agent, or Firm*—Hill, Gross, Simpson, Van Santen, Steadman, Chiara & Simpson

[57] ABSTRACT

An ornamental plant display system for prolonged display of a natural plant with its internal chemical structure and moisture content substantially unaltered comprising a transparent water-tight container for encompassing the plant, a plant coated with an opaque waterproof inert coating, such as composed of a blend of paraffin, mineral oil and an appropriate dye, a plastic support means for the plant and a transparent aqueous liquid within the container encompassing the plant having a pH value of about 4.2 to 4.4. and not more than 1 percent of a heavy metal sequestering agent. The pH value is attained by additions of sodium bisulfite and the sequestering agent is preferably sodium ethylene diamine tetraacetic acid. Benzophenone sunlight-absorbing agents may be included within the plant coating material to prevent bleaching or the like of plant colors.

7 Claims, 6 Drawing Figures

PATENTED JUN 11 1974

3,816,224
SHEET 2 OF 2
Fig-4
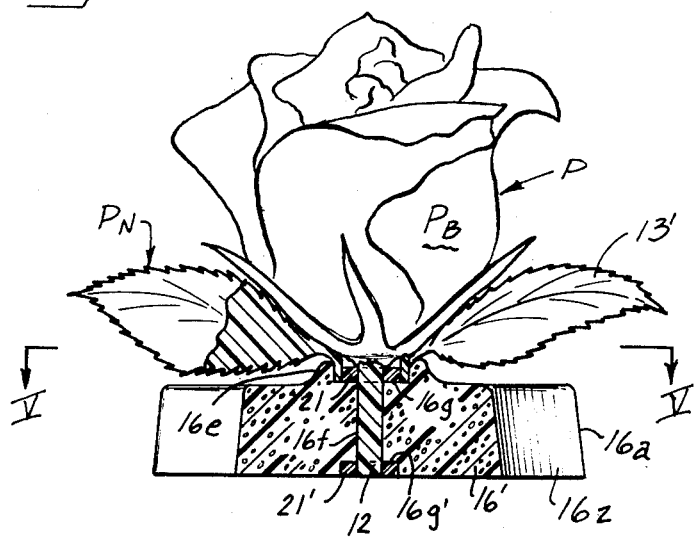
Fig-5
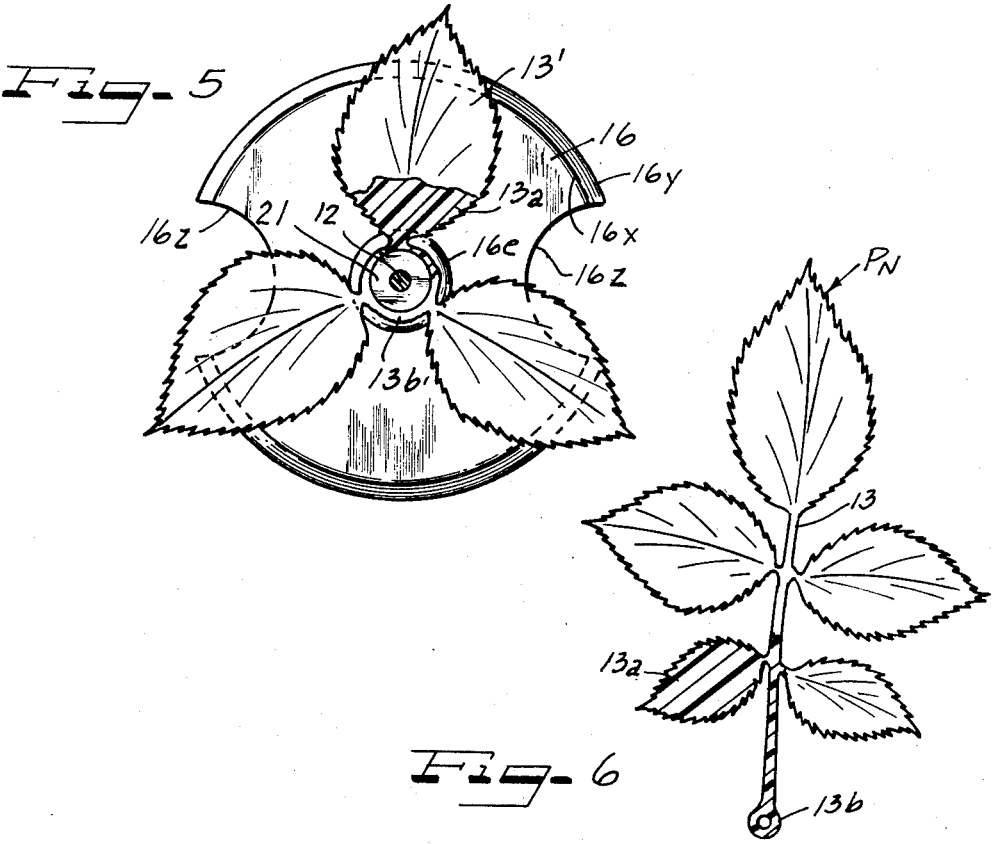
Fig-6

FLORAL DISPLAY

BACKGROUND OF THE INVENTION

1. Field of the Invention

The invention relates to real floral and plant display systems and somewhat more particularly to real plant display systems that maintain the natural appearance of a plant over extremely prolonged periods of time.

2. Prior Art

U.S. Pat. No. Re. 23,625 (owned by the instant assignee) discloses a floral display system for natural plants that includes a transparent water-tight container, a plant coated with an opaque waterproof inert coating and an aqueous liquid within the container encompassing the plant and containing a small amount of preservative therein, such as anti-oxidants, germicides and fungicides. Typically, such aqueous solutions have a pH value of 4.5 to 4.7. This display system was generally satisfactory for maintaining plants over a prolonged period of time. Nevertheless, some difficulties have been encountered in early spoilage or unsightliness of the display systems and extensive research was undertaken to determine the cause of such early deterioration and arrive at means of eliminating the same.

SUMMARY OF THE INVENTION

The invention provides a plant display system which maintains real plants over very long periods of time without discoloration or spoilage.

It is a novel feature of the invention to utilize an aqueous liquid having a pH in the range of about 4.2 to 4.4 along with a heavy-metal sequestering agent therein to encompass a specially coated plant being displayed. In preferred embodiments, sodium bisulfite is utilized to attain the desired pH and ethylene diamine tetraacetic acid is utilized as the sequestering agent. In certain embodiments, a benzophenone sunlight-absorbing agent is included in the plant coating material.

It is another novel feature of the invention to utilize only inert plastic members with the plant within the display system. In preferred embodiments, leaves and similar non-essential plant portions are replaced by similar portions composed of inert synthetic resinous materials and the blossom or the like of the plant is mounted on a stem member composed of an inert synthetic resinous material. Various other parts within the display system are also composed of inert materials.

BRIEF DESCRIPTION OF THE DRAWINGS

FIG. 4 is an elevated partially sectional view of a portion of a plant display embodiment constructed in accordance with the principles of the invention;

FIG. 5 is a partial sectional view taken along lines V—V of FIG. 4; and

FIG. 6 is an elevated plan view, partially in section, of a portion utilized in certain embodiments of the invention.

DESCRIPTION OF PREFERRED EMBODIMENTS

Figure 1:
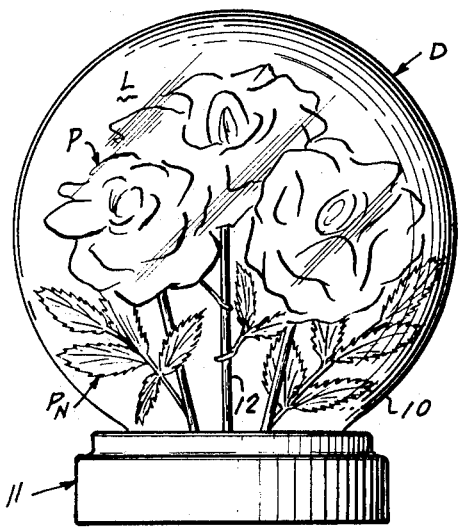
FIG. 1 is an elevated plan view of a plant display embodiment constructed in accordance with the principles of the invention.

The invention provides real plant display systems that maintain the natural appearance of a plant over extremely prolonged periods of time without discoloration of the liquid or plant therein.

U.S. Pat. No. Re. 23,625 suggests, among other things, that a "preservative liquid" for plants comprises a mixture of 4 grams of sodium bisulfite in one gallon of water (about 1,000 to 1,100 ppm). Typically, such a preservative liquid has a pH of 4.5 to 4.7 or above. Extensive research has shown that when such liquid is utilized to encompass a prepared plant, it has a marked extractive effect on the plant so that discoloration takes place. Further, over prolonged periods of time, the extracted materials tend to agglutinize or agglomerate and form a dark suspension that substantially deteriorates the appearance of a plant display system which includes such a high amount of bisulfite therein.

In addition, it has now been discovered that traces of various heavy metals, such as iron, copper, etc. are detrimental to prolonged natural appearance of plants being displayed in accordance with the principles of the invention. Traces of various heavy metals are present from time to time in commercially distilled water (sometimes utilized as a base liquid) or are extracted into the surrounding liquid from the "display system" (i.e. plants, dyes, waxes, etc.). Further, when certain plants required a separate support means, fine metal wires were utilized and metal ions therefrom migrated into the liquid. Apparently, minimal traces of, for example, copper or iron, rapidly catalyze oxidation of sodium bisulfite and render it ineffective for preserving the natural appearance of a plant being displayed.

As set forth in U.S. Pat. Re. 23,625, all types of plants, such as roses, carnations, nasturtiums, various vegetables, such as ears of corn, blooming trees, including apple, pear, plum, dogwood, cherry, Japanese cherry, Judas tree, mayapple, trilliums, tulips, orchids, toadstools, mushrooms, etc. are readily preserved to display the natural beauty thereof. An important feature of the invention is that a select plant can be preserved for display at a select growth condition, such as at the "peak flowering time." Accordingly, select plants may be picked for processing in accordance with the principles of the invention at any select time, including after they are no longer marketable through the ordinary channels of commerce because of attaining the peak of their natural beauty prior to or at the time of reaching retail outlets.

Select plants are procured while having their full natural shape and configuration along with their original natural coloring for processing and display in accordance with the invention.

During the development of the invention, it was noted that certain portions of a plant, such as rose leaves, contain a higher concentration of heavy metals than the blossom portion. Accordingly, in embodiments where leaves, stems, etc. (hereinafter and in the claims referred to as non-essential plant portions) are not required for display, such non-essential plant portions are removed prior to treatment and only the actual essential plant portions are displayed and/or the non-essential portions are replaced with members resembling the naturally appearing members but composed of an inert synthetic resinous material.

A procured plant is cleansed and inspected for damage to insure that only "perfect" specimens are utilized. The select specimens are dried sufficiently to only remove any exterior (i.e. on the outside of the plant) moisture and then substantially uniformly coated with a thin substantially continuous waterproof chemically inert opaque-like integument. The integument permanently adheres to the surfaces of the plant being coated and seals all surfaces thereof that may be accessible to liquid. This permanently seals the physical structure of the plant with its original moisture content substantially intact and its original and natural cell structure substantially unaltered so that the plant maintains a real or natural appearance when combined with the other portions of the display system.

The integument is composed of materials that are characterized as chemically inert, liquefiable at relatively low temperatures, compatible with and capable of dissolving various coloring materials, such as pigments, dyes, etc. and solidifiable into relatively flexible opaque-like coatings. Suitable integument materials include montan wax, Gersthofen wax, I.G. wax, carnauba wax, honeycomb wax, micro-crystalline wax, petroleum wax and white synthetic waxes such as amide esters having the formula:

$R - CO - NH - R' - O - CO - R$ wherein R–CO is a fatty acid radical containing from 7 to 17 carbon atoms and R' is an alkylene radical having from 1 to 6 carbon atoms; such as stearamide ethyl stearate:

$CH_3 - (CH_2)_{16} - CO - NH - (CH_2)_2 - O - CO - (CH_2)_{16} - CH_3$ bis (stearamide ethyl) adipate:

$CH_3 - (CH_2)_{16} - CO - NH - (CH_2)_4 - O - CO - (CH_2)_{16} - CH_3$ and diamides having the formula:

$R - CO - NH - R' - NH - CO - R$ wherein R and R' are the same as in the amide ester mentioned above, such as methylene distearamide:

$CH_3 - (CH_2)_{16} - CO - NH - CH_2 - NH - CO - (CH_2)_{16} - CH_3$

Any of the above materials, when the pure material has a melting point too high for compatibility with plant tissue, may be combined with diluents to reduce the melting point and to get a material that will not be injurious to plant tissue. For example, micro-crystalline petroleum waxes are miscible in all portions with ordinary mineral oil and the resulting blend solidifies into a homogeneous and stable solid which has a melting point below that of pure micro-crystalline wax.

For example, when paraffin is selected, it is possible to obtain different types of paraffin having melting points to about 180° F. or more and as low as 130° F. In an exemplary embodiment, 2½ pounds of paraffin certified to contain less than 1½ percent oil and moisture and having a melting point range of about 130° to 136° F. was melted to produce a volume of about one quart. The conventional water-white mineral oil having a viscosity of 95 to 100 Saybolt Universal, a color of 10 to 12 Saybolt Universal and a minimum pour point of 30° F. is added to the molten paraffin and the mixture was blended to obtain a homogeneous mixture. This mixture exhibited a tendency to form a skin at about 110° F. when standing in the air at room temperature. Such a mixture does not exhibit a definite melting point but solidifies gradually without segregation of its ingredients over a considerable range from about 110° F. down to at least 100° F. The thin coating formed on a select plant does not flow enough to spoil the display at temperatures as high as 105° F. Similarly, other waxes may be blended with various diluents to obtain a proper welding point range for use with plants.

At ordinary room temperatures, the coating utilized on a plant should effectively form a solid but rather flexible and tough, as compared to being brittle, film or the like. The formed coating must be waterproof and chemically inert so as not to react with the plant or the surrounding liquid. The coating utilized cannot absorb water or the like and must not crack or otherwise deteriorate even after prolonged water immersion. Once a select integument material is selected or appropriately blended so as to be liquefiable at a relatively low temperature that is not injurious to plant tissue, the material is heated up to its liquefiable point and a coloring medium is dispersed therein. It has been determined that the most delicate plants suitable for display in accordance with the invention tolerate at least 115° to 120° F. Accordingly, this is the upper liquefiable temperature range for a select integument material.

The coloring media may be selected from all types of coloring agents, such as pigments or dyes. Generally, solid colors are best produced by the use of dyes whereas spot-like stippling and/or stippled effects may be best secured by the use of pigment particles. Conventional oil-soluble dyes dissolve readily in the liquefied integument material. Careful selection is necessary to obtain a coloring media that is truly permanent under exposure to light when dispersed in an extremely thin integument layer and immersed in water. By appropriate blending of a coloring material with the integument, a material may be obtained that is a close color match with the actual plant if desired, however, plants of the best shape and size may be selected and then coated with an integument material having a color several shades darker or lighter than the original plant. Also, certain of the plant members may be covered with integument different in color from that coloring certain other plant members or portions thereof. Additionally, where aesthetic displays are desired, it is possible to produce, for example, blue roses and other beautiful and attractive combinations unknown in nature. Of course, when producing plants of an unnatural color, the precise tint of the original plant becomes immaterial.

In an exemplary embodiment of an integument material utilized to coat the petals of a typical red rose, the red coloring dye, D & C 18, Red of the Calco Dye Company of Bound Brook, N.J., was utilized. An exemplary formulation which approximates the color of the rose comprises a four-quart batch of integument material mixed with 3 grams of the above dye.

Once the integument material is properly colored, a select plant is coated therewith. The coating method may include immersion, flowing streams, jets and other like methods which coat substantially all surfaces of the plant being treated without damaging the form or the internal chemical or moisture composition thereof and seal such surfaces from a surrounding liquid. The sealing process may involve a brief heating, analogous to that required for pasteurizing milk, however, such heating does not harm the plant and by appropriately blending integument material with various diluents, excessive heating may be entirely avoided.

Initial preparation of select plants involves only selection of suitable specimens thereof and enough drying to eliminate sensible moisture on the surfaces which are to receive the integument. Any commercial flower raiser finds it necessary to raise sufficient plants to have a fair margin of safety with respect to fluctuations in demand, growth conditions, etc. and as a result throws away a substantial number of finished plants at the peak of their beauty. The invention allows transformation of such perishable and unsalable goods to permanent articles of maximum beauty that will remain substantially unimpaired in appearance for a matter of years so that otherwise commercially worthless byproducts become a material source of revenue. The prepared specimens are maintained at room temperature or below and are quickly subjected to a brief application of a prepared integument material.

When a quiescent bath is utilized, the mass of integument is kept just warm enough so that no skin or the like forms on the top surface, which is exposed to ambient room temperature and the entire specimen to be overcast is quickly but gently plunged into the liquefied mass for a second or two and then quickly lifted up above the bath and twirled or shaken gently to dislodge all but a very thin film of solidified integument. Insertion, withdrawal and shaking of excess liquid need only take about 3 seconds, about as fast as manual operation will permit. Effective control of integument thickness on the plant is obtained by varying the bath temperature. Maximum thicknesses result when the bath is as cool as it can be kept without forming a skin on the surface that interferes with manipulations. Raising the temperature thereof about 5° F. produces a much thinner coating. When thicker integument coatings are desired, the temperature may be lowered or the plant may be dipped a plurality of times.

When a select plant is being coated in a flowing stream of integument material, the plant can be twisted around in the stream so that somewhat better penetration into deep crevices and the like can be secured. A poured stream may fall onto a plant with a little more speed and exert a little more penetrating power. The gentle jet directed upward can deliver any desired velocity of impact, but because the integument material is moving against gravity, the jet may be adjusted to give the most thorough coating of all, not so much because of the available jet force but because gravity will assist the operator in presenting the plant with its individual petals, etc. fanned open for substantially uniform contact with the jet.

Generally, none of the coating procedures will provide a perfect seal at the bottom of every individual crotch and crevice of the plant, however, nearly all crotches, etc. are substantially completely sealed and generally at least all outer surfaces of a plant are sufficiently coated with integument material to prevent direct access of a liquid thereto.

After coating a plant with a select integument material, the plants are briefly exposed to room temperature or below to solidify the coating and insure that it permanently adheres to the surfaces of the plant. Such coated plants are now ready for positioning within the display system.

An immersion liquid is prepared for surrounding the coated plant within a display system. Preferably, the immersion liquid is clean water, such as obtained by filtration and/or distillation so as to be clear and attractive appearing. Various materials, such as, for example, set forth in U.S. Pat. Re. 23,625, may be added with the water to obtain either special effects on the plant or to aid in its preservation.

One essential ingredient is sodium bisulfite ($NaHSO_3$) added in an amount sufficient to produce a pH value within the liquid of about 4.2 to 4.4. This corresponds to about 100 to 200 ppm sodium bisulfite in the solution. The disassociation of sodium bisulfite at environments having a pH value of 4.2 to 4.4 is conductive to maintaining an advantageous ratio of $HSO_3^-$ ions to $NaHSO_3$ molecules so as to provide a requisite reducing environment within such solutions and materially prolong the useful life of a display system utilizing the same.

Another essential ingredient in the immersion liquid is a heavy-metal sequestering agent, present in amounts of not more than about 1 percent (based on the weight of the sodium bisulfite). Generally, the amount of heavy-metal sequestering agent ranges from about 0.01 to 1.0 percent and most preferably ranges from about 0.1 to 0.2 percent. Various heavy-metal sequestering agents are useful and ethylene diamine tetraacetic acid and/or its sodium salt are preferred.

In certain embodiments, organic benzoates, such as propyl benzoate, butyl benzoate, n-heptyl benzoate, etc. are also included within the immersion liquid. The inclusion of organic benzoates allows a reduction in the amount of bisulfite required within the immersion liquid. In certain environments, nascent $SO_2$ that inherently forms when bisulfite is added to a liquid is troublesome so that by including about 20 to 40 ppm of an organic benzoate, preferably 10 to 14 ppm of n-heptyl benzoate, substantially less bisulfite has to be added to the immersion liquid and less $SO_2$ forms. Additionally, organic benzoates are recognized antiseptic agents and contribute to the preservation of the plant being displayed.

When the display system of the invention is to be exposed to direct sunlight for extended periods of time, it is preferable to incorporate a sunlight-absorbing agent, such as a benzophenone within the liquefied integument material. The harmful portion of sunlight is its ultraviolet rays. Benzophenones are well known ultraviolet light absorbers, for example, U.S. Pat. No. 2,614,940 discloses that a sulfonated benzophenone may be incorporated within colored textiles or plastic materials to prevent them from fading. Other ultraviolet absorbing compounds are also known and all such compounds that are soluble or dispersible in the liquefied integument material of the invention are suitable for use in preventing fading or discoloration of the plant being displayed. In an exemplary embodiment, benzophenone ($C_6H_5 - CO - C_6H_5$) was dissolved in a paraffin-mineral oil-dye mixture and did not precipitate or settle out of the blend, clearly indicating that benzophenone is compatible with the integument material.

In the drawings, like parts are denoted by like reference numerals. FIG. 1 illustrates an embodiment of a complete display system D. As shown, a select plant P is supported by stem members 12 and surrounded by non-essential plant portions $P_N$, such as leaves, and disposed within an encompassing transparent container 10. The container 10 is substantially filled with an immersion liquid L that completely encompasses the plant P and the support means therefor. The container 10 is mounted on a display mounting means 11 so as to be suitable for positioning at a desired location. The display system D provides a very effective means of displaying the plant P over extremely prolonged periods of time, such as 5, 10 or more years.

Figure 2:
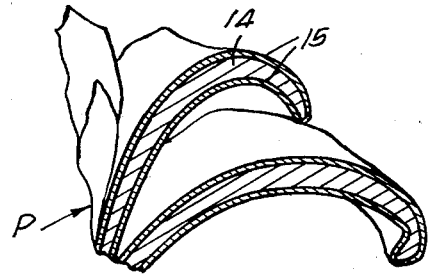
FIG. 2 is a partial diagrammatic sectional view of a plant portion treated in accordance with the principles of the invention.

As shown in FIG. 2, the individual portions of the plant P are coated with an outer integument layer 15 so that the center plant portion 14 is protected from the encompassing liquid and retains its internal chemical structure and moisture content substantially unaltered. As indicated earlier, the integument or enveloping layer on the surface of a plant covers and/or seals substantially all surfaces thereof, however, when the plant includes numerous deep crotches or crevices, the integument may form "bridges" or the like between adjacent surfaces without actually coating the lower portions of such crotches or crevices. Nevertheless, such coatings are effective to seal the plant surfaces from the encompassing immersion liquid. In this regard, it should be pointed out that the most delicate plant structures suitable for processing according to the invention can withstand temperatures of at least 115° F. and usually up to 120° F. At these temperatures, the liquefied integument is sufficiently liquefied to penetrate and coat substantially all surfaces of the plant.

Figure 3:
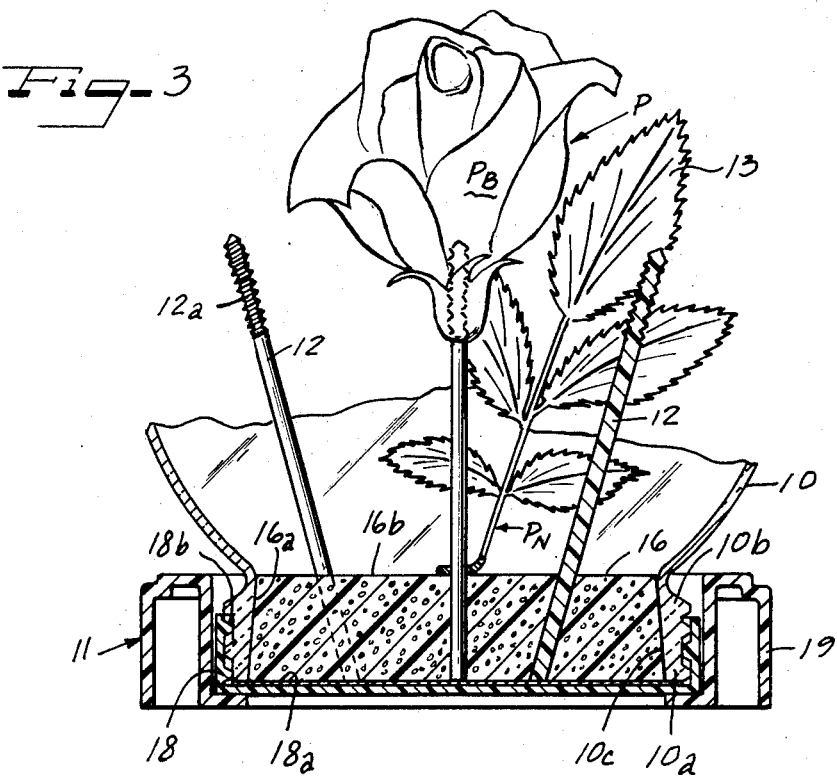
FIG. 3 is a partial sectional view, partially in plan, of an embodiment of the invention.

As shown in FIG. 3, the container 10 is preferably composed of glass, although various transparent plastics, such as acrylics, may also be utilized. The container 10 is formed into any desired shape and preferably is formed into a somewhat spherical shape with a depending neck 10a which provides access to the interior of the container. Thread means 10b are provided along the outer surfaces of the neck 10a for mating with complementary thread means of a member sealing the interior of the container from ambient environment. The inner surface 10c of the neck 10a is flared outwardly from true perpendicular for ease in assembly of the display as will be explained hereinafter.

A closure member 18 is provided with an inner diameter for mating with the outer diameter of neck portion 10. Thread means 18b are provided along the inner upstanding walls of member 18 for mating with the thread means 10b of the neck 10a and for sealing the interior of the container 10 from ambient atmosphere. A waterproof liner plate 18a is provided along the upfacing surface of member 18 to insure that no leakage or the like takes place.

An outer base member 19 substantially encompasses the neck 10a, along with the closure member 18 so as to provide an esthetic unitary display mounting means 11.

A mounting block member 16 is positioned with the interior of the neck 10a so as to substantially fill the same and provide an upfacing surface 16a that is approximately flush with the display mounting means 11, although this is not essential. The block member 16 is provided with outwardly flaring side walls 16a that substantially mate with the outwardly flared inner side walls 10c of the neck 10a. By forming adjacent side walls in a complementary flaring fashion, assembly is simplified since an operator or a machine merely inserts the block member 16 until it snugly fits within the neck 10a. In this regard, lateral cut-out portion 16z (best seen at FIGS. 4 and 5) are provided for ease of manipulating the block member 16 during assembly. Further, in certain embodiments, such as shown at FIG. 5, the outer side walls are stepped so as to have a greater diameter along the lower portion 16y thereof than at an upper portion 16x. With this type of structure, the upper portion 16x of the block member side walls do not actually contact the adjacent wall portions of neck 10a and only the lower portion 16y of block 16 mate with adjacent wall portions of the neck. Very little force is required to properly seat a block member having such stepped side walls and of course only the lower portion 16y of the walls need be flared.

The block member 16 is composed of an inert synthetic resinous material, such as styrene, which is available under the name STYROFOAM. This is a composition of styrene which is generally manufactured by heating aniline, paraldehyde and hydrochloric acid. Styrofoam is a well known material that may be characterized as rather fluffy, spongy or cork-like in appearance, having a relatively low density, a relatively tough outer skin for anchoring and holding a rigid member, such as a stem member, inserted therein and being substantially inert to aqueous liquids.

One or more stem members 12 are inserted at various angles into the block member 16 so as to project outwardly from the upfacing surface 16a thereof. The stem members 12 are preferably composed of an inert clear plastic material, such as an acrylic and formed into a size compatible with the display system. If desired, the artificial stem members may be colored to resemble a natural stem. The upper portion of each stem member 12 is provided with thread means 12a for anchoring a plant portion, such as a plant blossom $P_B$ thereon for display within the container.

One or more simulated non-essential plant portions $P_N$, such as artificial leaves 13, are mounted on the stem members 12. The number of artificial leaves utilized on a given stem member or within a given display system is determined by aesthetic considerations. As best seen at FIGS. 5 and 6, artificial leaves 13 are composed of a synthetic resinous material 13b in a form and color closely resembling natural or real leaves. Each leaf 13 has a mounting means 13b, such as a circular collar adapted to fit on a support portion within the container, such as on one of the stem members 12.

The embodiment illustrated at FIG. 3 is suitable for a multi-plant display, such as a tri-bouquet of roses or the like. The embodiment shown at FIGS. 4 and 5 is suitable for a single plant display.

In embodiments for a single plant display, a somewhat modified mounting block member 16' is utilized. Member 16' is formed into a somewhat trapezoidal cross-section, i.e. with its side walls 16a flared outwardly substantially as described in conjunction with block member 16, and includes cut-outs 16z along the side walls for manipulation of the block. Member 16' is additionally provided with a raised center portion 16e having a depression or valley 16g therein. A similar depression 16g' is provided along the bottom of the block member 16' as shown. An axial bore 16f passes through the block member 16 and joins the depression 16g with one another for mounting of a stem member 12 therein. A synthetic leaf member 13' (best seen at FIG. 5) is formed as a plurality of individual leafs joined together by a circular collar portion 13b' which fits within the upper depression 16g. An upper keeper member 21 fits within the opening in collar 13b' and forces the collar into snug engagement with the side walls of the upper depression 16g. A lower keeper member 21' is forced into the lower depression 16g'. The stem member 12 passes through the center opening in both keeper members and through the axial bore 16f for rigid mounting in block member 16. A single plant P, such as a blossom $P_B$ is axially threaded onto stem member 12 and mounted on block member 16'. Once assembled, the block member 16 is manipulated so that the plant P, non-essential plant portions $P_N$ and associated elements are inserted within a container, such as 10 (FIG. 2). Once inserted, the container is substantially filled with the immersion liquid and a closure member, such as 18, is secured to the bottom of the container to seal the liquid therein. The order of assembly is not critical and, if desired, the container 10 may be first filled with liquid and the mounted flower then inserted.

As is apparent from the foregoing specification, the present invention is susceptible of being embodied with the various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as is set forth and defined in the hereto-appendant claims.

We claim as our invention:

1. An ornamental plant display comprising:
   a natural blossom including a pistil and a perianth of a plant member with its internal chemical structure and moisture content substantially unaltered;
   a relatively thin, water insoluble, somewhat opaque, chemically inert coating adhering to substantially all of the surfaces of said blossom;
   a plastic stem member for supporting said blossom for view;
   at least one plastic leaf member arranged about said blossom and on said stem member in a substantially natural plant configuration;
   a support member composed of a foamed synthetic resin for supporting said stem member;
   a transparent container encompassing said blossom, stem member, plastic leaf member and support member;
   a sealing member sealing said container from ambient atmosphere;
   a substantially clear, transparent, aqueous liquid within said container and encompassing said blossom, stem member, plastic leaf member and support member, said aqueous liquid having a pH value in the range of 4.2 to 4.4 and not more than about 1 percent of a heavy-metal sequestering agent.

2. An ornamental plant display as defined in claim 1 wherein the aqueous liquid comprises water with a sufficient amount of sodium bisulfite to obtain a pH value of 4.2 to 4.4 and the heavy-metal sequestering agent is sodium ethylene diamine tetraacetic acid.

3. An ornamental plant display as defined in claim 1 wherein the aqueous solution is water containing 5 to 40 parts per million of an organic benzoate, 100 to 200 parts per million of sodium bisulfite and 100 to 200 parts per million of sodium ethylene diamine tetraacetic acid.

4. An ornamental plant display as defined in claim 1 wherein the coating is a blend of paraffin, mineral oil, an oil-soluble dye and a benzophenone sunlight-absorbing material.

5. An ornamental plant display as defined in claim 1 wherein the container includes a neck portion having outwardly flared inner side walls and the support member has substantially mating outwardly flared peripheral side walls whereby a snug fit between said support member and neck portion of the container is attained.

6. An ornamental plant display as defined in claim 1 wherein the stem member and leaf member are composed of a synthetic resinous material which is substantially inert to a plant member and to the aqueous solution.

7. An ornamental plant display system comprising:
   a natural plant with its internal chemical structure and moisture content substantially unaltered;
   a relatively thin, water insoluble, somewhat opaque, chemically inert coating adhering to substantially all of the surfaces of said plant;
   a synthetic support means composed of an inert resinous material for supporting said plant;
   a transparent container encompassing said plant and support means;
   a sealing means for sealing said container from ambient atmosphere;
   a substantially clear, transparent, aqueous liquid within said container and encompassing said plant and support means; said aqueous liquid having an amount of sodium bisulfite sufficient to obtain a pH value of 4.2 to 4.4 within said liquid, said aqueous liquid having about 0.1 to 0.2 percent of sodium ethylene diamine tetraacetic acid.

* * * * *